US008283417B2

(12) United States Patent
Vanek et al.

(10) Patent No.: US 8,283,417 B2
(45) Date of Patent: *Oct. 9, 2012

(54) IMPACT MODIFIER COMPOSITION, AN IMPACT RESISTANT COMPOSITION, METHOD OF PRODUCING THE SAME, AND ARTICLES MADE THEREFROM

(75) Inventors: Charles M. Vanek, Hurricane, WV (US); Mark T. Berard, Baton Rouge, LA (US); Edward M. Bridge, Baton Rouge, LA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,917

(22) Filed: Jun. 24, 2011

(65) Prior Publication Data

US 2011/0251350 A1 Oct. 13, 2011

Related U.S. Application Data

(63) Continuation of application No. 12/277,401, filed on Nov. 25, 2008, now abandoned.

(60) Provisional application No. 60/990,927, filed on Nov. 29, 2007.

(51) Int. Cl.
*C08L 23/04* (2006.01)
*C08L 27/04* (2006.01)
*C08L 27/06* (2006.01)
*C08L 27/08* (2006.01)
*C08L 33/14* (2006.01)

(52) U.S. Cl. .......................... 525/213; 525/239; 525/240

(58) Field of Classification Search .................. 525/213, 525/239, 240
See application file for complete search history.

(56) References Cited

U.S. PATENT DOCUMENTS

| | | | |
|---|---|---|---|
| 2,586,363 A | 2/1952 | McAlevy | |
| 3,006,889 A | 10/1961 | Frey et al. | |
| 3,209,055 A | 9/1965 | Hedberg et al. | |
| 3,296,222 A | 1/1967 | Dixon et al. | |
| 3,299,014 A | 1/1967 | Kalil | |
| 3,396,211 A | 8/1968 | Bonotto et al. | |
| 3,454,544 A | 7/1969 | Young et al. | |
| 3,459,591 A | 8/1969 | Kouishi et al. | |
| 4,113,805 A * | 9/1978 | Frey et al. ...................... | 525/239 |
| 4,280,940 A | 7/1981 | Klug et al. | |
| 4,591,621 A | 5/1986 | Ennis | |
| 4,767,823 A | 8/1988 | Jones et al. | |
| 5,242,987 A | 9/1993 | Brugel | |
| 5,272,236 A | 12/1993 | Lai et al. | |
| 5,278,272 A | 1/1994 | Lai et al. | |
| 6,124,406 A | 9/2000 | Cinadr et al. | |
| 6,204,334 B1 | 3/2001 | Cinadr et al. | |
| 6,706,815 B2 * | 3/2004 | Marchand et al. ............ | 525/191 |
| 6,849,694 B2 | 2/2005 | Hata | |
| 6,875,820 B2 * | 4/2005 | Berard et al. ............... | 525/331.5 |
| 7,659,334 B2 * | 2/2010 | Berard et al. .................. | 524/284 |
| 2004/0039119 A1 | 2/2004 | Berard et al. | |

FOREIGN PATENT DOCUMENTS

| | | |
|---|---|---|
| EP | 0 418 966 * | 3/1991 |
| WO | WO-01/81463 A2 | 11/2001 |
| WO | WO-03/051986 A2 | 6/2003 |
| WO | WO-2004/083300 | 9/2004 |
| WO | WO-2007/109042 A1 | 9/2007 |

OTHER PUBLICATIONS

International Search Report PCT/US2008/084615.
Eastwood, E.A., et al., Compatibilization of poly(vinyl chloride) and polyolefin elastomer blends with multiblock/blocky chlorinated polyethylenes, Polymer, 2002, pp. 6707-6717, vol. 43, Elsevier Science.

* cited by examiner

*Primary Examiner* — Nathan M Nutter

(57) ABSTRACT

The instant invention is an impact resistant composition, method of producing the same, and articles made therefrom. The impact resistant composition comprises (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the impact resistant composition has an instrumented dart drop impact of greater than 0.90 inch-pounds per mil at −10° C. The method for producing the impact resistant composition comprises the steps of (1) selecting poly(vinyl chloride); (2) selecting an impact modifier composition comprising; (a) less than 30 percent by weight of high-density polyethylene, based on the weight of the impact modifier composition; and (b) at least 70 percent by weight of chlorinated polyethylene, based on the weight of the impact modifier composition; (3) melt blending the poly(vinyl chloride) and the impact modifier composition; and (4) thereby producing the impact resistant composition comprising at least 85 percent by weight of poly(vinyl chloride), based on the weight of the impact resistant composition; and (2) less than 10 percent by weight of the impact modifier composition.

9 Claims, No Drawings

IMPACT MODIFIER COMPOSITION, AN IMPACT RESISTANT COMPOSITION, METHOD OF PRODUCING THE SAME, AND ARTICLES MADE THEREFROM

CROSS-REFERENCE TO RELATED APPLICATIONS

This application is a continuation application of U.S. Nonprovisional application Ser. No. 12/277,401, filed on Nov. 25, 2008, entitled "IMPACT MODIFIER COMPOSITION, AN IMPACT RESISTANT COMPOSITION, METHOD OF PRODUCING THE SAME, AND ARTICLES MADE THEREFROM," which claims priority from the U.S. Provisional Patent Application No. 60/990,927, filed on Nov. 29, 2007, entitled "IMPACT MODIFIER COMPOSITION, AN IMPACT RESISTANT COMPOSITION, METHOD OF PRODUCING THE SAME, AND ARTICLES MADE THEREFROM," the teachings of which are incorporated by reference herein, as if reproduced in full hereinbelow.

FIELD OF INVENTION

The instant invention relates to an impact modifier composition, an impact resistant composition, method of producing the same, and articles made therefrom.

BACKGROUND OF THE INVENTION

The use of poly(vinyl chloride) ("PVC") both in its rigid form and flexible form as films, sidings, sheets, pipes, and tubing is generally well known. Rigid PVC is a hard and brittle thermoplastic polymer that is typically mixed with a modifier to form a composition that is less prone to failure on impact.

Many modifications to poly(vinyl chloride) have been made to transform hard poly(vinyl chloride) into a softer, less brittle material. These processes are generally divided into external plasticizing processes, which are carried out by means of innumerable plasticizers known, recommended and used for these purposes and by internal plasticizing, wherein various other polymers are blended or combined with poly (vinyl chloride) homopolymers or copolymers. Whichever method is carried out, considerable disadvantages have remained. For example, when using external plasticizers, the extractability and tendency of the plasticizer to travel has been pronounced, in addition to a general decrease in either weathering or heat-aging characteristics of poly(vinyl chloride). When using internal plasticizers such as copolymers, the advantages obtained by using such materials often entails the loss of dimensional stability and the like.

One particular disadvantage of PVC which has long been known is the extreme brittleness of the unmodified material. It has long been known to modify PVC by adding high polymeric natural and synthetic substances. For example, vinyl chloride polymers are frequently plasticized with plasticizers which can migrate from the composition with age, particularly at elevated temperatures.

U.S. Pat. No. 3,006,889 describes the use of a blend of post-chlorinated polyvinylchloride, chlorinated polyethylene and chlorosulfonated polyethylene.

U.S. Pat. No. 3,209,055 describes polymeric blends of vinyl chloride polymer with chlorinated or chlorosulfonated polyethylene which are cross-linked to improve resistance to heat distortion.

U.S. Pat. No. 3,396,211 describes compositions of vinyl chloride and randomly chlorinated polyethylene as an impact modifier for rigid poly(vinyl chloride) compositions.

U.S. Pat. No. 3,459,591 describes the method of producing heat sealable gas and vapor impermeable films by applying a coating on at least one surface of the film comprising a homopolymer or copolymer of vinylidene chloride or vinyl chloride together with a chlorinated or chlorosulfonated polyolefin having a crystalline structure.

U.S. Pat. No. 4,280,940 describes transparent thermoplastic compositions on the basis of vinyl chloride polymers consisting of a mixture of a special vinyl chloride polymer and two different, differently chlorinated chloropolyethylenes.

U.S. Pat. No. 4,767,823 describes halogenated ethylene polymers having a reduced tendency to block. The halogenated resins are prepared from polyethylene and ethylene polymer starting materials which have a weight-based median particle size of from about 120 to about 600 microns and a weight-based particle size distribution such that more than 60 percent of the particles have a particle size of from about 130 to about 850 microns. The halogenated resins also have a weight-based median particle size of from about 200 to about 900 microns. The halogenated polyethylene resins have a chemically combined halogen content of from about 26 to about 42 weight percent whereas the halogenated ethylene polymer resins have a chemically combined halogen content of from about 15 to about 28 weight percent. The halogenated ethylene polymer resins are prepared from ethylene polymer starting materials which have polymerized therein up to five weight percent of 1-olefin monomer copolymerizable with ethylene.

U.S. Pat. No. 6,875,820 describes a chlorinated polyolefin impact modifier for vinyl chloride polymers. The chlorinated olefin impact modifier is prepared from an olefin polymer base resin having $I_{10}$ values of 0.05 to 0.8 g/10 minute.

German Pat. No. 1,111,383 describes a high impact molding composition based on post-chlorinated vinyl chloride copolymers produced by adding 10 to 50 percent of chlorinated and/or chlorosulfonated products of high polymeric aliphatic hydrocarbons such as polyethylene to the post chlorinated polymers.

Japan Kokai 56-17255 describes manufacturing products coated with flame retarding chlorinated rubber comprising 15 to 80 weight percent chlorine such as chlorinated polyethylene, chlorosulfonated polyethylene and PVC.

Despite the research efforts in developing poly(vinyl chloride) compositions having improved low temperature impact properties, there is still a need for a poly(vinyl chloride) composition having improved low temperature impact properties at optimum efficiency.

SUMMARY OF THE INVENTION

The instant invention is an impact modifier composition, an impact resistant composition, method of producing the same, and articles made therefrom. The impact modifier composition comprises (a) less than 30 percent by weight of high-density polyethylene, based on the weight of the impact modifier composition; and (b) at least 70 percent by weight of chlorinated polyethylene, based on the weight of the impact modifier composition. The method for producing the impact modifier composition comprises the steps of (1) selecting high-density polyethylene in a powder form; (2) selecting chlorinated polyethylene in a powder form; (3) uniformly admixing said high-density polyethylene and said chlorinated polyethylene; and (4) thereby producing said impact modifier composition, wherein said impact modifier composition comprises (a) less than 30 percent by weight of high-density polyethylene based on the total weight of the impact modifier composition, based on the weight of impact modifier composition; and (b) at least 70 percent by weight of chlorinated polyethylene, based on the weight of the impact modifier composition. The impact resistant composition comprises (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the impact resistant composition has an instrumented dart drop impact of greater than 0.90 inch-pounds per mil at −10° C. The method for producing the impact resistant composition comprises the steps of (1) selecting poly(vinyl chloride); (2) selecting an impact modifier composition comprising; (a) less than 30 percent by weight of high-density polyethylene, based on the weight of the impact modifier composition; and (b) at least 70 percent by weight of chlorinated polyethylene, based on the weight of the impact modifier composition; (3) melt blending the poly (vinyl chloride) and the impact modifier composition; and (4) thereby producing the impact resistant composition comprising at least 85 percent by weight of poly(vinyl chloride), based on the weight of the impact resistant composition; and (2) less than 10 percent by weight of the impact modifier composition. The article comprises (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the article has an instrumented dart drop impact of greater than 0.90 inch-pounds per mil at −10° C.

In one embodiment, the instant invention provides an impact modifier composition comprising (a) less than 30 percent by weight of high-density polyethylene, based on the weight of the impact modifier composition; and (b) at least 70 percent by weight of chlorinated polyethylene, based on the weight of the impact modifier composition.

In an alternative embodiment, the instant invention further provides an impact resistant composition comprising (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the impact resistant composition has an instrumented dart drop impact of greater than 0.90 inch-pounds per mil at −10° C.

In an alternative embodiment, the instant invention further provides an impact resistant composition comprising the melt blending product of (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the impact resistant composition has an instrumented dart drop impact of greater than 0.90 inch-pounds per mil at −10° C.

In an alternative embodiment, the instant invention further provides a method for producing an impact modifier composition comprising the steps of (1) selecting high-density polyethylene in a powder form; (2) selecting chlorinated polyethylene in a powder form; (3) uniformly admixing said high-density polyethylene and said chlorinated polyethylene; and (4) thereby producing said impact modifier composition, wherein said impact modifier composition comprises (a) less than 30 percent by weight of high-density polyethylene, based on the weight of the impact modifier composition; and (b) at least 70 percent by weight of chlorinated polyethylene, based on the weight of the impact modifier composition.

In an alternative embodiment, the instant invention further provides a method for producing an impact resistant composition comprising the steps of (1) selecting poly(vinyl chloride); (2) selecting an impact modifier composition comprising; (a) less than 30 percent by weight of high-density polyethylene, based on the weight of the impact modifier composition; and (b) at least 70 percent by weight of chlorinated polyethylene, based on the weight of the impact modifier composition; (3) melt blending the poly(vinyl chloride) and the impact modifier composition; and (4) thereby producing the impact resistant composition comprising at least 85 percent by weight of poly(vinyl chloride), based on the weight of the impact resistant composition; and (2) less than 10 percent by weight of an impact modifier composition, based on the weight of the impact resistant composition.

In another alternative embodiment, the instant invention further provides an article comprising (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of the impact modifier composition; and (b) at least 70 percent by weight of chlorinated polyethylene, based on the weight of the impact modifier composition; wherein the article has an instrumented dart drop impact of greater than 0.90 inch-pounds per mil at −10° C.

In an alternative embodiment, the instant invention provides an impact modifier composition, an impact resistant composition, method of producing the same, and articles made therefrom, in accordance with any of the preceding embodiments, except that the high-density polyethylene is in powder form.

In an alternative embodiment, the instant invention provides an impact modifier composition, an impact resistant composition, method of producing the same, and articles made therefrom, in accordance with any of the preceding embodiments, except that the chlorinated polyethylene is in powder form.

In an alternative embodiment, the instant invention provides an impact modifier composition, an impact resistant composition, method of producing the same, and articles made therefrom, in accordance with any of the preceding embodiments, except that the impact modifier composition has a average particle size of less than 600 μm.

In an alternative embodiment, the instant invention provides an impact modifier composition, an impact resistant composition, method of producing the same, and articles made therefrom, in accordance with any of the preceding embodiments, except that the impact modifier composition has a average particle size of less than 550 µm.

In an alternative embodiment, the instant invention provides an impact modifier composition, an impact resistant composition, method of producing the same, and articles made therefrom, in accordance with any of the preceding embodiments, except that the impact modifier composition has a average particle size of less than 500 µm.

DETAILED DESCRIPTION OF THE INVENTION

The instant invention is an impact modifier composition, an impact resistant composition, method of producing the same, and articles made therefrom.

The impact modifier composition comprises (a) high-density polyethylene; and (b) chlorinated polyethylene. The impact modifier composition may comprise less than 30 percent by weight of high-density polyethylene, based on the weight of the impact modifier composition. All individual values and subranges from less than 30 weight percent are included herein and disclosed herein; for example, the high-density polyethylene weight percent may be from a lower limit of 1, 3, 5, 7, 9, 11, 13, 15, 17, 19, 21, 23, 25, 27 or 29 weight percent to an upper limit of 4, 6, 8, 10, 12, 14, 16, 18, 20, 22, 24, 26, 28 or 30. For example, impact modifier composition may comprise less than 25 percent by weight of high-density polyethylene, based on the weight of the impact modifier composition; or in the alternative, the impact modifier composition may comprise less than 20 percent by weight of high-density polyethylene, based on the weight of the impact modifier composition. The impact modifier composition may comprise at least 70 percent by weight of the chlorinated polyethylene, based on the weight of the impact modifier composition. All individual values and subranges equal or greater that 70 weight percent are included herein and disclosed herein; for example, the chlorinated polyethylene weight percent may be from a lower limit of 70, 75, 80, 85 or 90 weight percent to an upper limit of 75, 80, 85, 90, 95, 96, 97, 98, or 99. For example, impact modifier composition may comprise at least 75 percent by weight of chlorinated polyethylene, based on the weight of the impact modifier composition; or in the alternative, the impact modifier composition may comprise at least 80 weight percent by weight of chlorinated polyethylene, based on the weight of the impact modifier composition; or in the alternative, the impact modifier composition may comprise at least 85 weight percent by weight of chlorinated polyethylene, based on the weight of the impact modifier composition; or in the alternative, the impact modifier composition may comprise at least 90 weight percent by weight of chlorinated polyethylene, based on the weight of the impact modifier composition; or in the alternative, the impact modifier composition may comprise at least 95 weight percent by weight of chlorinated polyethylene, based on the weight of the impact modifier composition.

The high-density polyethylene may be an ethylene homopolymer or an ethylene copolymer. The high-density polyethylene may have a density in the range of 0.940 to 0.970 g/cm$^3$. All individual values and subranges from 0.940 to 0.970 g/cm$^3$ are included herein and disclosed herein; for example, the density of the high-density polyethylene may be from a lower limit of 0.940, 0.943, 0.945, 9.47, or 0.950 g/cm$^3$ to an upper limit of 0.955, 0.960, 0.963, 0.965, or 0.970 g/cm$^3$. The high-density polyethylene may have a melt index ($I_{10}$) of less than 100 g/10 minutes. All individual values and subranges from less than 100 g/10 minutes are included herein and disclosed herein; for example, the melt index ($I_{10}$) can be from a lower limit of 0.5, 1.0, 1.5, 2.0, 5.0, 10.0, 15.0, or 20 g/10 minutes to an upper limit of 0.7, 1.0, 1.5, 2.0, 2.5, 5.0, 10.0, 15.0, 20, 50, or 100 g/10 minutes. For example, the high-density polyethylene may have a melt index ($I_{10}$) in the range of 0.5 to 100 g/10 minutes; or in the alternative, the high-density polyethylene may have a melt index ($I_{10}$) in the range of 0.5 to 50 g/10 minutes; or in the alternative, the high-density polyethylene may have a melt index ($I_{10}$) in the range of 0.5 to 20 g/10 minutes; or in the alternative, the high-density polyethylene may have a melt index ($I_{10}$) in the range of 0.5 to 10 g/10 minutes; or in the alternative, the high-density polyethylene may have a melt index ($I_{10}$) in the range of 0.5 to 5 g/10 minutes; or in the alternative, the high-density polyethylene may have a melt index ($I_{10}$) in the range of 0.5 to 2.5 g/10 minutes.

The high-density polyethylene may include any amount of one or more alpha-olefin comonomers; for example, the high-density polyethylene may comprise about less than 15 percent by weight of one or more alpha-olefin comonomers, based on the weight of the high-density polyethylene. All individual values and subranges less than 15 weight percent are included herein and disclosed herein; for example, the weight percent of one or more alpha-olefin comonomers may be from a lower limit of 0, 1, 2, 3, 5, 7, 9, 12, or 14 weight percent to an upper limit of 5, 9, 10, 12, or 15 weight percent. For example, the high-density polyethylene may comprise about less than 10 percent by weight of one or more alpha-olefin comonomers, based on the weight of the high-density polyethylene; or in the alternative, the high-density polyethylene may comprise about less than 7 percent by weight of one or more alpha-olefin comonomers, based on the weight of the high-density polyethylene; in the alternative, the high-density polyethylene may comprise about less than 5 percent by weight of one or more alpha-olefin comonomers, based on the weight of the high-density polyethylene.

The high-density polyethylene may include any amount of ethylene; for example, the high-density polyethylene may comprise about at least 85 percent by weight of ethylene, based on the weight of the high-density polyethylene. All individual values and subranges equal or greater than 85 weight percent are included herein and disclosed herein; for example, the weight percent of ethylene may be from a lower limit of 85, 87, 88, 90, 91, 95, 98, or 99 weight percent to an upper limit of 90, 91, 93, 95, 98, or 100. For example, the high-density polyethylene may comprise at least 85 percent by weight of ethylene, based on the weight of the high-density polyethylene; or in the alternative, the high-density polyethylene may comprise at least 90 percent by weight of ethylene, based on the weight of the high-density polyethylene; in the alternative, the high-density polyethylene may comprise at least 95 percent by weight of ethylene, based on the weight of the high-density polyethylene.

The alpha-olefin comonomers typically have no more than 20 carbon atoms. For example, the alpha-olefin comonomers may preferably have 3 to 10 carbon atoms, and more preferably 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The alpha-olefin comonomers may preferably be selected from the group consisting of propylene, 1-butene, 1-hexene, and 1-octene, and more preferably from the group consisting of 1-hexene and 1-octene.

The high-density polyethylene may be in any physical form; for example, the high density polyethylene may be pellet, micropellet, or powder. The high-density polyethylene may preferably be in the powder form. Pellets are typically defined as solid particulates with an average particle size of 2 to 10 mm, preferably 2 to 4 mm. Micropellets are typically defined as solid particulates with an average particle size of 1000 μm to about 2 mm. Powders are typically defined as solid particulates with an average particle size of less than 1000 microns. The high-density polyethylene may have any average particle size; for example, the high-density polyethylene may have an average particle size in the range of less than 10 mm. All individual values and subranges from less than 10 mm are included herein and disclosed herein; for example, the high-density polyethylene may have an average particle size in the range of less than 4 mm; or in the alternative, the high-density polyethylene may have an average particle size in the range of 2 to 4 mm; or in the alternative, the high-density polyethylene may have an average particle size in the range of less than 2000 μm; or in the alternative, the high-density polyethylene may have an average particle size in the range of 1000 to 2000 μm; or in the alternative, the high-density polyethylene may have an average particle size in the range of less than 1000 μm; or in the alternative, the high-density polyethylene may have an average particle size in the range of less than 600 μm; or in the alternative, the high-density polyethylene may have an average particle size in the range of less than 500 μm; or in the alternative, the high-density polyethylene may have an average particle size in the range of less than 400 μm.

Any conventional ethylene homopolymerization or copolymerization reactions may be employed to produce the high-density polyethylene component of the instant invention. Such conventional ethylene homopolymerization or copolymerization reactions include, but are not limited to, gas phase polymerization, slurry phase polymerization, liquid phase polymerization, and combinations thereof using conventional reactors, e.g. gas phase reactors, loop reactors, stirred tank reactors, batch reactors, and combinations thereof in series or parallel.

The chlorinated polyethylene may be any chlorinated polyethylene. The chlorinated polyethylene may be a chlorinated polyethylene homopolymer; or in the alternative, the chlorinated polyethylene may be a chlorinated polyethylene copolymer that contains copolymerized units of (a) ethylene and (b) up to 15 weight percent of a copolymerizable monomer, based on the weight of the polyethylene copolymer. In one embodiment, the chlorinated polyethylene is derived from a substantially linear high-density polyethylene homopolymer or copolymer with at least one or more other alpha-olefin that can contain up to 10 carbon atoms, having a density of at least 0.940 g/cm$^3$ and having a chlorine content of from about 15 to about 50 percent by weight after chlorination. Such chlorinated polyethylenes are described in U.S. Pat. No. 3,396,211, incorporated herein by reference.

The chlorinated olefin polymer may optionally contain chlorosulfonyl groups. That is, the polymer chain will have pendant chlorine groups and chlorosulfonyl groups. Such polymers are known as chlorosulfonated olefin polymers.

Representative chlorinated and chlorosulfonated ethylene polymers include (a) chlorinated and chlorosulfonated homopolymers of ethylene and (b) chlorinated and chlorosulfonated copolymers of ethylene and at least one or more ethylenically unsaturated monomer selected from the group consisting of $C_3$ to $C_{10}$ alpha-olefin comonomer; C1 to $C_{12}$ alkyl esters of $C_3$ to $C_{20}$ monocarboxylic acids; unsaturated $C_3$ to $C_{10}$ mono- or dicarboxylic acids; anhydrides of unsaturated $C_4$ to $C_8$ dicarboxylic acids; and vinyl esters of saturated $C_2$ to $C_{18}$ carboxylic acids. Chlorinated and chlorosulfonated graft copolymers are included as well. Specific examples of suitable polymers include chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Preferred chlorinated olefin polymers are-chlorinated polyethylene and chlorinated copolymers of ethylene vinyl acetate.

The polyethylene base resin for the chlorinated polyethylene may an ethylene homopolymer or an ethylene copolymer. The polyethylene base resin for the chlorinated polyethylene may have a density in the range of 0.940 to 0.970 g/cm$^3$. All individual values and subranges from 0.940 to 0.970 g/cm$^3$ are included herein and disclosed herein; for example, the density of the polyethylene base resin for the chlorinated polyethylene may be from a lower limit of 0.940, 0.943, 0.945, 9.47, or 0.950 g/cm$^3$ to an upper limit of 0.955, 0.960, 0.963, 0.965, or 0.970 g/cm$^3$. The polyethylene base resin for the chlorinated polyethylene may have a melt index ($I_{10}$) of less than 100 g/10 minutes. All individual values and subranges from less than 100 g/10 minutes are included herein and disclosed herein; for example, the melt index ($I_{10}$) can be from a lower limit of 0.05, 0.5, 1.0, 1.5, 2.0, 5.0, 10.0, 15.0, or 20 g/10 minutes to an upper limit of 0.7, 0.8, 1.0, 1.5, 2.0, 2.5, 5.0, 10.0, 15.0, 20, 50, or 100 g/10 minutes. For example, the polyethylene base resin for the chlorinated polyethylene may have a melt index ($I_{10}$) in the range of 0.5 to 100 g/10 minutes; or in the alternative, the polyethylene base resin for the chlorinated polyethylene may have a melt index ($I_{10}$) in the range of 0.5 to 50 g/10 minutes; or in the alternative, the polyethylene base resin for the chlorinated polyethylene may have a melt index ($I_{10}$) in the range of 0.5 to 20 g/10 minutes; or in the alternative, the polyethylene base resin for the chlorinated polyethylene may have a melt index ($I_{10}$) in the range of 0.5 to 10 g/10 minutes; or in the alternative, the polyethylene base resin for the chlorinated polyethylene may have a melt index ($I_{10}$) in the range of 0.5 to 5 g/10 minutes; or in the alternative, the polyethylene base resin for the chlorinated polyethylene may have a melt index ($I_{10}$) in the range of 0.5 to 2.5 g/10 minutes; or in the alternative, the polyethylene base resin for the chlorinated polyethylene may have a melt index ($I_{10}$) in the range of 0.05 to 0.8 g/10 minutes.

The chlorinated and/or chlorosulfonated ethylene polymers useful in the practice of the instant invention may contain from 15 to 42 percent by weight of chlorine, based on the weight of the chlorinated or chlorosulfonated ethylene polymer. All individual values and subranges from 15 to 42 weight percent are included herein and disclosed herein; for example, chlorinated and/or chlorosulfonated ethylene polymers useful in the practice of the instant invention may contain from 15 to 36 percent by weight of chlorine, based on the weight of the chlorinated or chlorosulfonated ethylene polymer; or in the alternative, chlorinated and/or chlorosulfonated ethylene polymers useful in the practice of the instant invention may contain from 20 to 36 percent by weight of chlorine, based on the weight of the chlorinated or chlorosulfonated ethylene polymer; or in the alternative, chlorinated and/or chlorosulfonated ethylene polymers useful in the practice of the instant invention may contain from 20 to 30 percent by weight of chlorine, based on the weight of the chlorinated or chlorosulfonated ethylene polymer.

If the chlorinated ethylene polymer is chlorosulfonated, it will generally have a sulfur content of up to 6 weight percent, preferably 1-3 weight percent.

The chlorinated olefin polymers and chlorosulfonated olefin polymers suitable for use in the impact resistant compositions of the invention may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state or fluidized bed. Free radical suspension chlorination processes are described and taught in U.S. Pat. Nos. 3,454,544, 4,767,823 and references cited therein. Such processes involve preparation of an aqueous suspension of a finely divided ethylene polymer which is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363; 3,296,222; 3,299,014; and 5,242,987.

The impact modifier composition may be produced via any method. For example, the impact modifier composition may be produced by the physical blending of the high-density polyethylene component and the chlorinated polyethylene via a method selected from the group consisting of ribbon blending, high-intensity mixing, static mixing, tumble blending, and the like. The impact modifier composition is a physical blend and it does not require crosslinking or vulcanization in order to be useful as commercial products.

The high impact resistant composition according to the instant invention comprises vinyl chloride polymer and impact modifier composition, as described hereinabove. The high impact resistant composition according to instant invention may comprise at least 85 percent by weight of the vinyl chloride polymer, based on the combined weight of the vinyl chloride polymer and the impact modifier composition. All individual values and subranges from at least 85 weight percent are included herein and disclosed herein; for example, the high impact resistant composition may comprise from a lower limit of 85, 86, 87, 88, 89, 90, 92, 94, 96, 98, or 99 percent by weight of the vinyl chloride polymer, based on the combined weight of the vinyl chloride polymer and the impact modifier composition to an upper limit of 86, 87, 88, 89, 90, 92, 94, 96, 98, or 100 percent by weight of the vinyl chloride polymer, based on the combined weight of the vinyl chloride polymer and the impact modifier composition. For example, the high impact resistant composition may comprise from 85 to 99 percent by weight of the vinyl chloride polymer, based on the combined weight of the vinyl chloride polymer and the impact modifier composition; or in the alternative, the high impact resistant composition may comprise from 87 to 99 percent by weight of the vinyl chloride polymer, based on the combined weight of the vinyl chloride polymer and the impact modifier composition; or in the alternative, the high impact resistant composition may comprise from 88 to 99 percent by weight of the vinyl chloride polymer, based on the combined weight of the vinyl chloride polymer and the impact modifier composition; or in the alternative, the high impact resistant composition may comprise from 90 to 99 percent by weight of the vinyl chloride polymer, based on the combined weight of the vinyl chloride polymer and the impact modifier composition. The high impact resistant composition according to instant invention may comprise less than 10 percent by weight of the impact modifier composition, based on the combined weight of the vinyl chloride polymer and the impact modifier composition. All individual values and subranges from less than 10 weight percent are included herein and disclosed herein; for example, the high impact resistant composition may comprise from a lower limit of 1, 2, 3, 4, 5, 6, 7, 8, or 9 percent by weight of the impact modifier composition, based on the combined weight of the vinyl chloride polymer and the impact modifier composition to an upper limit of 2, 3, 4, 5, 6, 7, 8, 9, or 10 percent by weight of the impact modifier composition, based on the combined weight of the vinyl chloride polymer and the impact modifier composition. For example, the high impact resistant composition may comprise from 1 to 10 percent by weight of the impact modifier composition, based on the combined weight of the vinyl chloride polymer and the impact modifier composition; or in the alternative, the high impact resistant composition may comprise from 1 to 8 percent by weight of the impact modifier composition, based on the combined weight of the vinyl chloride polymer and the impact modifier composition; or in the alternative, the high impact resistant composition may comprise from 1 to 6 percent by weight of the impact modifier composition, based on the combined weight of the vinyl chloride polymer and the impact modifier composition; or in the alternative, the high impact resistant composition may comprise from 1 to 5 percent by weight of the chloride impact modifier composition, based on the combined weight of the vinyl chloride polymer and the impact modifier composition. The impact resistant composition may have any instrumented dart drop impact. For example, the impact resistant composition may have an instrumented dart drop impact of greater than 0.90 inch-pounds per mil at $-10°$ C. All individual values and subranges from greater than 0.90 inch-pounds per mil at $-10°$ C. are included herein and disclosed herein; for example, the impact resistant composition may have an instrumented dart drop impact of greater than 0.91 inch-pounds per mil at $-10°$ C.; or in the alternative, the impact resistant composition may have an instrumented dart drop impact of greater than 0.92 inch-pounds per mil at $-10°$ C.; or in the alternative, the impact resistant composition may have an instrumented dart drop impact of greater than 0.95 inch-pounds per mil at $-10°$ C.; or in the alternative, the impact resistant composition may have an instrumented dart drop impact of greater than 1.00 inch-pounds per mil at $-10°$ C.; or in the alternative, the impact resistant composition may have an instrumented dart drop impact of greater than 1.20 inch-pounds per mil at $-10°$ C.

The vinyl chloride polymer component may be any vinyl chloride polymer. For example, the vinyl chloride polymer may be a solid, high molecular weight polymer. The vinyl chloride polymer may be a polyvinyl chloride homopolymer or a copolymer of vinyl chloride having copolymerized units of one or more additional comonomers. When present, such comonomers will account for up to 20 weight percent of the copolymer, preferably from 1-10 weight percent of the copolymer, and most preferably 1-5 weight percent of the copolymer. Examples of suitable comonomers include, but are not limited to $C_2$-$C_{10}$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Such homopolymers and interpolymerized copolymers are commercially available from Georgia Gulf Corp., Atlanta, Ga., USA. They may also be prepared by any suitable polymerization method. Exemplary polymers may be prepared via suspension process.

Graft copolymers of vinyl chloride are also suitable for use in the invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component.

One or more additives may further be added to the high impact resistant composition Exemplary additives include, but are not limited to, stabilizers, blowing agents, fillers, lubricants, colorants, crosslinking agents, process aids, and the like. Exemplary additives include, but are not limited to, tin stabilizers, calcium carbonate, titanium dioxide, acrylic process aids, and hydrocarbon and ester waxes. Up to 50 parts by weight of one or more additives per 100 parts of the high impact resistant composition may be added to the high impact composition. All individual values and subranges from up to 50 parts per 100 parts of the high impact resistant composition are included herein and disclosed herein; for example, one or more additives may be present from a lower limit of 0.1, 0.5, 1, 5, 10, 15, 20, 30, 35, 40, 45, or 49 parts per 100 parts of the high impact resistant composition to an upper limit of 1, 5, 10, 15, 20, 30, 35, 40, 45, or 50 parts per 100 parts of the high impact resistant composition. For example, from 0.1 to 50 parts by weight of one or more additives per 100 parts of the high impact resistant composition may be added to the high impact composition; or in the alternative, from 0.5 to 40 parts by weight of one or more additives per 100 parts of the high impact resistant composition may be added to the high impact composition; or in the alternative, from 1 to 30 parts by weight of one or more additives per 100 parts of the high impact resistant composition may be added to the high impact composition; or in the alternative, from 5 to 25 parts by weight of one or more additives per 100 parts of the high impact resistant composition may be added to the high impact composition; or in the alternative, from 10 to 25 parts by weight of one or more additives per 100 parts of the high impact resistant composition may be added to the high impact composition; or in the alternative, from 15 to 25 parts by weight of one or more additives per 100 parts of the high impact resistant composition may be added to the high impact composition; or in the alternative, from 15 to 20 parts by weight of one or more additives per 100 parts of the high impact resistant composition may be added to the high impact composition.

One or more polymers may further be added to the high impact resistant composition. Such one or more polymers include, but are not limited to, acrylonitrile butadiene styrene copolymers (ABS), methacrylate butadiene styrene copolymers, (MBS), modified acrylic polymers.

The method for producing the impact resistant composition comprises the steps of (1) selecting poly(vinyl chloride); (2) selecting an impact modifier composition comprising; (a) less than 30 percent by weight of high-density polyethylene, based on the weight of impact modifier composition; and (b) at least 70 percent by weight of chlorinated polyethylene, based on the weight of impact modifier composition; (3) melt blending the poly(vinyl chloride) and the impact modifier composition; and (4) thereby producing the impact resistant composition comprising at least 85 percent by weight of poly(vinyl chloride), based on the weight of the impact resistant composition; and (2) less than 10 percent by weight of the impact modifier composition. In an exemplary process for producing the impact resistant composition of the instant invention, the vinyl chloride polymer component in a powder form and the impact modifier composition in the powder form are fed into an extruder, e.g. single screw extruder or twin screw extruder, and melt blended into a substantially homogenous mixture at melt temperatures in the range of 150° C. to 220° C. All individual values and subranges from 150° C. to 220° C. are included herein and disclosed herein; for example, the melt temperature may be from a lower limit of 150, 155, 160, 165, 170, 175, 180, 185, 190, 195, 200, 210, 215° C. to an upper limit of 155, 160, 165, 170, 175, 180, 185, 190, 195, 200, 210, 215, or 220° C. For example, the melt temperature may be in the range of 160 to 215° C., or in the alternative, the melt temperature may be in the range of 160 to 210° C., or in the alternative, the melt temperature may be in the range of 160 to 205° C., or in the alternative, the melt temperature may be in the range of 160 to 200° C., or in the alternative, the melt temperature may be in the range of 160 to 195° C., or in the alternative, the melt temperature may be in the range of 160 to 190° C. The high impact resistant compositions according to the instant invention are physical blends and do not require crosslinking or vulcanization.

The articles according to the instant invention comprise (1) at least 85 percent by weight of poly(vinyl chloride), based on the weight of the impact resistant composition; and (2) less than 10 percent by weight of an impact modifier composition, based on the weight of the impact resistant composition, comprising; (a) less than 30 percent by weight of high-density polyethylene, based on the weight of impact modifier composition; and (b) at least 70 percent by weight of chlorinated polyethylene, based on the weight of impact modifier composition; wherein the article has an instrumented dart drop impact of greater than 0.90 inch-pounds per mil at −10° C. Such articles include, but are not limited to, rigid PVC articles, PVC sidings, PVC window profiles, PVC pipes, fences, decks, conduits and like. The articles according to instant invention may have any instrumented dart drop impact. For example, the articles according to instant invention may have an instrumented dart drop impact of greater than 0.90 inch-pounds per mil at −10° C. All individual values and subranges from greater than 0.85 inch-pounds per mil at −10° C. are included herein and disclosed herein; for example, the articles may have an instrumented dart drop impact of greater than 0.91 inch-pounds per mil at −10° C.; or in the alternative, the articles may have an instrumented dart drop impact of greater than 0.92 inch-pounds per mil at −10° C.; or in the alternative, the articles may have an instrumented dart drop impact of greater than 0.95 inch-pounds per mil at −10° C.; or in the alternative, the articles may have an instrumented dart drop impact of greater than 1.00 inch-pounds per mil at −10° C.; or in the alternative, the articles may have an instrumented dart drop impact of greater than 1.20 inch-pounds per mil at −10° C.

EXAMPLES

The following examples illustrate the present invention but are not intended to limit the scope of the invention. The examples of the instant invention demonstrate that the high impact compositions according to instant invention possess improved low temperature impact properties at optimum efficiency.

Inventive samples 1-3 and comparatives 1-7 were prepared according to the following process. The formulations for inventive samples 1-3 and comparative samples 1-7 are shown in Tables I and II. TYRIN™ 2500P is a chlorinated polyethylene (~25% chlorine content), commercially available from The Chemical Company, Midland, Mich., USA. SHINTECH 950 is a vinyl chloride polymer, commercially available from Shintech, Inc., Houston, USA. HDPE-1 is a high-density polyethylene, which was provided by The Dow Chemical Company, having a density of 0.965 g/cc, and melt index ($I_{10}$) of 95 g/10 minutes. HDPE-2 is a high-density polyethylene, which was provided by The Dow Chemical Company, having a density of 0.965, and melt index ($I_{10}$) of 2.3 g/10 minutes. HDPE-3 is a high-density polyethylene, which was provided by The Dow Chemical Company, having a density of 0.965, and melt index ($I_{10}$) of 0.5 g/10 minutes. The formulation components for inventive samples 1-3 and comparative samples 1-7, as shown in Tables I and II, were mixed in a high intensity Little ford blender, and the blend was extruded via a Cincinnati Milacron CM-55 conical twin screw extruder attached to a sheet die at a motor load of approximately 43-45 amps, and a IR temperature of approximately 380-385° F. The samples were tested for instrumented dart drop impact according to ASTM D-3763-02, and the results are shown in Table III.

Test Methods

Test methods include the following:

The instrumented dart drop impact was determined according to ASTM D-3763-02 (Dynatup Impact @–10° C.).

Density was measured according to ASTM D 792-03, Method B, in isopropanol.

Melt index ($I_{10}$) was measured at 190° C. under a load of 10.0 kg according to ASTM D-1238-03.

Average Particle Size was determined via Beckman Coulter LS 13 320 Laser Diffraction Particle Size Analyzer.

The present invention may be embodied in other forms without departing from the spirit and the essential attributes thereof, and, accordingly, reference should be made to the appended claims, rather than to the foregoing specification, as indicating the scope of the invention.

TABLE I

| Formulation Components | Units | Inventive 1 | Inventive 2 | Inventive 3 |
|---|---|---|---|---|
| SHINTECH 950 (PVC) | Parts | 100 | 100 | 100 |
| TYRIN 2500P | Parts | 3.2 | 3.2 | 3.2 |
| HDPE-1 | Parts | 0.8 | — | — |
| HDPE-2 | Parts | — | 0.8 | — |
| HDPE-3 | Parts | — | — | 0.8 |
| OMYACRAB UFT (Calcium Carbonate) | Parts | 12 | 12 | 12 |
| STEARIC ACID | Parts | 0.25 | 0.25 | 0.25 |
| AC 629A (Oxidized PE Wax) | Parts | 0.15 | 0.15 | 0.15 |
| CALCIUM STEARATE | Parts | 0.8 | 0.8 | 0.8 |
| PARALOID K-120N (Acrylic Process Aid) | Parts | 1.0 | 1.0 | 1.0 |
| HOSTALUB XL165 (Paraffin Wax) | Parts | 1.5 | 1.5 | 1.5 |
| ADVASTAB TM-286 (Methyl Tin Stabilizer) | Parts | 1.0 | 1.0 | 1.0 |
| TI-PURE R960 (Titanium Dioxide) | Parts | 0.5 | 0.5 | 0.5 |
| Total Parts | Parts | 121.2 | 121.2 | 121.2 |

TABLE II

| Formulation Components | Units | Comparative 1 | Comparative 2 | Comparative 3 | Comparative 4 | Comparative 5 | Comparative 6 | Comparative 7 |
|---|---|---|---|---|---|---|---|---|
| SHINTECH 950 (PVC) | Parts | 100 | 100 | 100 | 100 | 100 | 100 | 100 |
| TYRIN 2500P | Parts | 4.0 | 2.0 | 0.8 | 2.64 | 2.0 | 2.64 | 2.0 |
| HDPE-1 | Parts | — | 2.0 | 3.2 | — | — | — | — |
| HDPE-2 | Parts | — | — | — | 1.36 | 2.0 | — | — |
| HDPE-3 | Parts | — | — | — | — | — | 1.36 | 2.0 |
| OMYACRAB UFT (Calcium Carbonate) | Parts | 12 | 12 | 12 | 12 | 12 | 12 | 12 |
| STEARIC ACID | Parts | 0.25 | 0.25 | 0.25 | 0.25 | 0.25 | 0.25 | 0.25 |
| AC 629A (Oxidized PE Wax) | Parts | 0.15 | 0.15 | 0.15 | 0.15 | 0.15 | 0.15 | 0.15 |
| CALCIUM STEARATE | Parts | 0.8 | 0.8 | 0.8 | 0.8 | 0.8 | 0.8 | 0.8 |
| PARALOID K-120N (Acrylic Process Aid) | Parts | 1.0 | 1.0 | 1.0 | 1.0 | 1.0 | 1.0 | 1.0 |
| HOSTALUB XL165 (Paraffin Wax) | Parts | 1.5 | 1.5 | 1.5 | 1.5 | 1.5 | 1.5 | 1.5 |
| ADVASTAB TM-286 (Methyl Tin Stabilizer) | Parts | 1.0 | 1.0 | 1.0 | 1.0 | 1.0 | 1.0 | 1.0 |
| TI-PURE R960 (Titanium Dioxide) | Parts | 0.5 | 0.5 | 0.5 | 0.5 | 0.5 | 0.5 | 0.5 |
| Total Parts | Parts | 121.2 | 121.2 | 121.2 | 121.2 | 121.2 | 121.2 | 121.2 |

TABLE III

| | Instrumented Dart Drop Impact (Dynatup Impact @ –10° C.) |
|---|---|
| Inventive 1 | 1.43 |
| Inventive 2 | 1.25 |
| Inventive 3 | 1.68 |
| Comparative 1 | 0.89 |
| Comparative 2 | 0.24 |
| Comparative 3 | 0.03 |
| Comparative 4 | 0.82 |
| Comparative 5 | 0.37 |
| Comparative 6 | 0.56 |
| Comparative 7 | 0.64 |

We claim:

1. An impact resistant composition comprising the melt blending product of:
    at least 80 percent by weight of vinyl chloride polymer;

less than 10 percent by weight of an impact modifier composition comprising;
from greater than 0 to less than 25 percent by weight of high-density polyethylene based on the total weight of the impact modifier composition; and
at least 75 percent by weight of chlorinated polyethylene.

2. The impact resistant composition of claim 1, wherein said vinyl chloride polymer is in the powder form.

3. The impact resistant composition of claim 1, wherein said high-density polyethylene is in the powder form.

4. The impact resistant composition of claim 1, wherein said chlorinated polyethylene is in the powder form.

5. An impact resistant composition comprising:
at least 85 percent by weight of units derived from vinyl chloride polymer; and
less than 10 percent by weight of units derived from an impact modifier composition comprising;
from greater than 0 to less than 25 percent by weight of high-density polyethylene based on the total weight of the impact modifier composition; and
at least 75 percent by weight of chlorinated polyethylene.

6. The impact resistant composition of claim 5, wherein said impact resistant composition has a instrumented dart drop impact of greater than 0.90 inch-pounds per mil at $-10°$ C.

7. An article comprising:
at least 85 percent by weight of units derived from vinyl chloride polymer; and
less than 10 percent by weight of units derived from an impact modifier composition comprising;
from greater than 0 to less than 25 percent by weight of high-density polyethylene based on the total weight of the impact modifier composition; and
at least 75 percent by weight of chlorinated polyethylene;
wherein said article has a instrumented dart drop impact of greater than 0.90 inch-pounds per mil at $-10°$ C.

8. The article according to claim 7, wherein said article is a pipe, siding, window profile, door profile, decking, railing, conduit, and the like.

9. The article according to claim 7, wherein said article has a instrumented dart drop impact of greater than 0.90 inch-pounds per mil at $-10°$ C.

\* \* \* \* \*